United States Patent [19]
Hope et al.

[11] Patent Number: 6,080,267
[45] Date of Patent: Jun. 27, 2000

[54] METHOD OF ELECTROCONDUCTIVE FASTENING OF CURRENT COLLECTORS AND TERMINALS IN ELECTROCHEMICAL DEVICES

[75] Inventors: Stephen F. Hope, Huntington Valley; Joseph B. Kejha, Meadowbrook, both of Pa.

[73] Assignee: Lithium Technology Corporation, Plymouth Meeting, Pa.

[21] Appl. No.: 09/249,921

[22] Filed: Feb. 12, 1999

Related U.S. Application Data

[63] Continuation of application No. 08/708,349, Sep. 4, 1996, abandoned, which is a continuation of application No. 08/233,401, Apr. 26, 1994, abandoned.

[51] Int. Cl.[7] .......................................................... C09J 5/00
[52] U.S. Cl. ..................... 156/305; 29/623.4; 156/306.3; 156/324.4; 429/122; 442/16; 442/21; 442/41; 442/52; 442/54
[58] Field of Search ................................. 156/306.3, 305, 156/324.4; 29/623.4; 429/122; 442/16, 21, 41, 52, 54

[56] References Cited

U.S. PATENT DOCUMENTS 3,226,275  12/1965  Kiess .................................... 156/305

FOREIGN PATENT DOCUMENTS 1310165  10/1962  France ................................... 156/305

*Primary Examiner*—John J. Gallagher
*Attorney, Agent, or Firm*—Zachary T. Wobensmith, III

[57] ABSTRACT

A method of electroconductive fastening of electroconductive materials in electrochemical devices, where a sheet of metal or a sheet of electrically conductive fibers is to have a second sheet joined thereto which can be of solid sheet metal, and where at least one tape with an adhesive layer thereon is placed on top of one of the sheets, with the adhesive layer facing the sheets, and the assembly is subjected to pressure, and the adhesive layer is activated, causing the sheets to fasten together in electroconductive contact, and wherein a second tape with an adhesive layer facing the sheets may be applied from the other side prior to pressure application.

23 Claims, 3 Drawing Sheets

METHOD OF ELECTROCONDUCTIVE FASTENING OF CURRENT COLLECTORS AND TERMINALS IN ELECTROCHEMICAL DEVICES

CROSS REFERENCE TO RELATED APPLICATIONS

This application is a continuation of our prior application Ser. No. 08/708,349, filed Sep. 4, 1996 entitled: "Method of Electroconductive Fastening of Current Collectors and Terminals," now abandoned which is a continuation of our prior application Ser. No. 08/233,401, filed Apr. 26, 1994 entitled: "Method of Electroconductive Fastening of Current Collectors and Terminals in electrochemical Devices," now abandoned.

BACKGROUND OF THE INVENTION

1. Field of the Invention

A method of electroconductive fastening of substrates, current collectors and terminals of similar and dissimilar materials, especially carbon fibers and metal foils used in the construction of alkali metal and alkaline earth metal batteries, and other electrochemical devices, which method uses the application of pressure, and tape having an adhesive layer thereon to secure the substrates, current collectors, and terminals together.

2. Description of the Prior Art

In constructing alkaline metal and alkaline earth metal batteries and other electrochemical devices, it is often necessary to electroconductively connect various carbon fiber current collectors, or substrates to metal terminals. The prior art methods of connection used various electroconductive glues or soldering. There are many disadvantages in using electroconductive glues, since their electroconductivity when assembled may be poor, or the resistance to chemicals used in the batteries may be low. As a result, the materials may separate and/or suffer from diminished electrical conductivity.

The use of hot soldering is limited as it can only be done between similar metals, and not between metals and other materials such as carbon fibers, nor can it be used to join two pieces of carbon fiber material.

The use of cold soldering with a soft metal as the conductive glue is possible, but any cold soldering metal except gold will eventually suffer from galvanic corrosion caused by the presence of carbon fibers, will disintegrate and lose its conductivity, especially at higher voltage and current levels. Gold as a cold soldering material is too expensive to be practical for use in large quantities in batteries and other electrochemical devices.

The method of fastening of the invention provides a superior product that does not suffer from prior art problems and provides many advantages over the prior art.

SUMMARY OF THE INVENTION

A method of electroconductive fastening of similar and/or dissimilar electroconductive materials, where one or more sheets, or a sheet and a terminal are placed on top of each other and the combination is inserted between one or more tapes with their adhesive layers facing the combination, and at least one of the tapes is wider (larger) than at least one of the sheets, at at least two of the ends of the electroconductive sheets, and the whole assembly is subjected to adhesive activation such as pressure, which causes the combination to be fastened together in intimate contact to produce an electroconductive product.

If the combination consists of two sheets of carbon fibers, configured into woven or non-woven open mesh nets, the adhesive is pressed into the net openings and partially encapsulates the fibers, but does not insulate the fibrous net sheets from each other, and maintains them in electroconductive contact.

If the combination consists of a sheet of metal and another sheet of a woven or non-woven carbon fiber open mesh net or fabric, the adhesive layer facing the net or fabric is pressed into the net or fabric openings, partially encapsulating the fibers and adhering to the metal sheet, but does not electrically insulate the sheets from each other, and fastens them together in intimate electroconductive contact.

If the combination consists of two sheets of metal such as metal foil, the tapes must be larger than the sheets and in adhesive contact with the sheets and each other around at least two edges of the sheets.

It should be noted that the open mesh net sheets may also be of carbon fibers coated with metal, or of metallic fibers, or expanded metal foil or any woven or non-woven materials, and the same method of fastening the sheets is used.

Since there is no metallic solder, or any metallic salt in the adhesive, there is nothing to galvanically corrode the fastening of the combination and therefore it will not lose electroconductivity but will maintain adequate strength over time.

The principal object of the invention is to provide a method of electroconductive fastening of electroconductive materials such as carbon fiber current collectors and metal terminals used in alkali metal or alkaline earth metal batteries and other electrochemical devices.

A further object of the invention is to provide a method of the character aforesaid wherein the product does not delaminate and has good electrical conductivity characteristics.

A further object of the invention is to provide a method of the character aforesaid, which can be used to electroconductively join dissimilar materials such as metals and carbon fibers.

A further object of the invention is to provide a method of the character aforesaid, wherein the resultant product is of high durability and is lightweight.

A further object of the invention is to provide a method of the character aforesaid, which can be used to electroconductively join similar materials such as carbon/graphite fiber sheets to carbon/graphite fiber sheets, or metal sheets to metal sheets.

A further object of the invention is to provide a method of the character aforesaid, which can be used to electroconductively join two electrically conductive fibrous net sheets.

A further object of the invention is to provide a method of the character aforesaid, which can be used to electroconductively join an electrically conductive fibrous net sheet to a electrically conductive sheet of metal.

A further object of the invention is to provide a method of the character aforesaid, which is fast, economical, easy to use, and feasible for mass production.

Other objects and advantageous features of the invention will be apparent from the description and claims.

It should, of course, be understood that the description an drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENT

The preferred configuration of carbon/graphite fibers used as a current collector in alkali metal and alkaline earth metal batteries and other electrochemical devices is in the form of a woven or non-woven open mesh net web or sheet. The current collectors may be made of other materials such as nickel-coated carbon fibers, or an expanded metal foil, or a metal foil and other desired materials. The preferred metal sheet or terminal to be electrically connected to a carbon fiber sheet is of nickel foil, which has excellent corrosion resistance.

The preferred tape material used with alkali metal or alkaline earth metal batteries and other electrochemical devices is plastic and more particularly an anhydrous polypropylene polymer of well known type. However, the tape material may also be of metal foil, and preferably nickel. The preferred adhesive layer on the tape for alkali metal or alkaline earth metal batteries, or other electrochemical devices is an acrylic based, pressure activated anhydrous adhesive of well known type. The adhesive may also contain a nickel powder or a carbon powder, which further enhances its non-corrosive electroconductive properties. Other adhesive such as heat or radiation activated adhesives may also be used.

Figure 1:
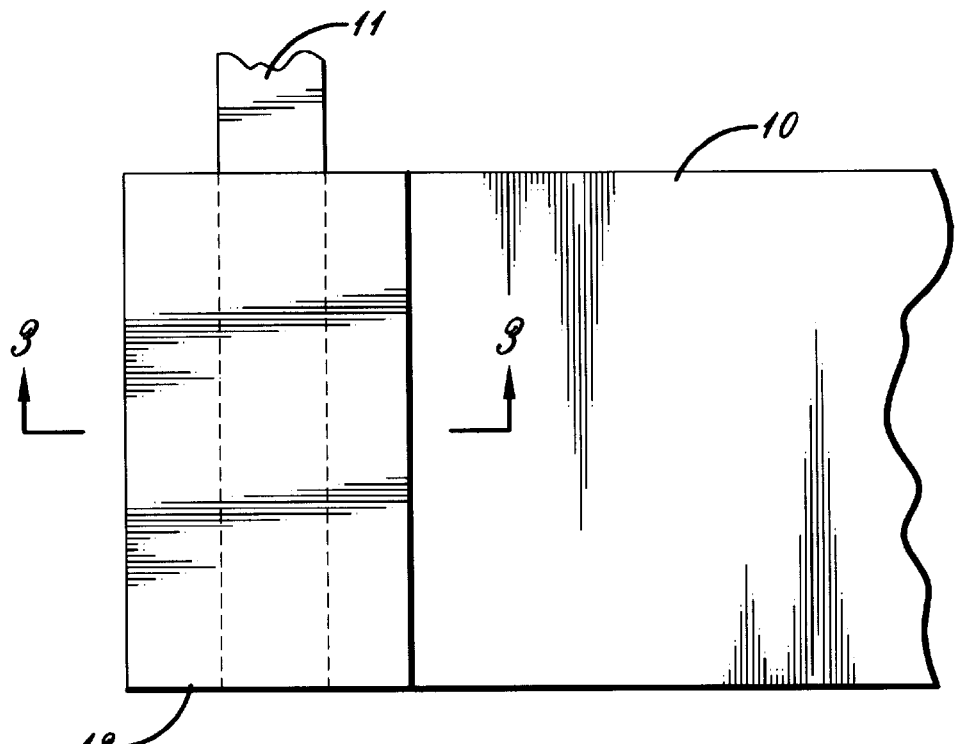
FIG. 1 illustrates the electroconductive joining of a fibrous open mesh net sheet or expanded foil used as a current collector, with a metal foil sheet terminal in an electrochemical device.
Figure 2:
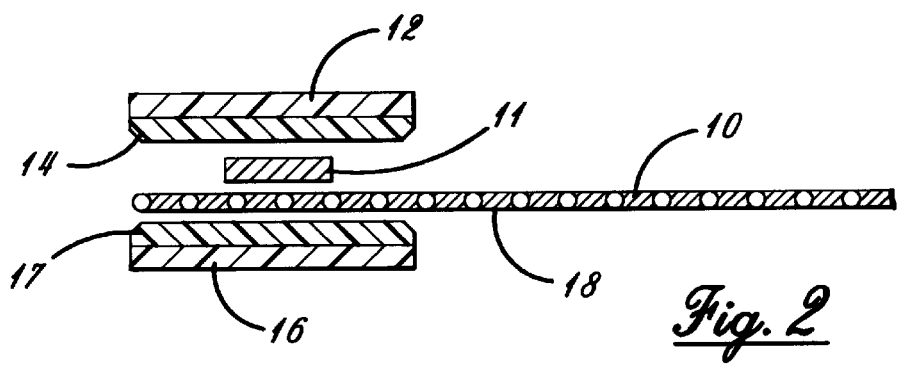
FIG. 2 is an exploded view of the product of FIG. 1 prior to assembly.
Figure 3:
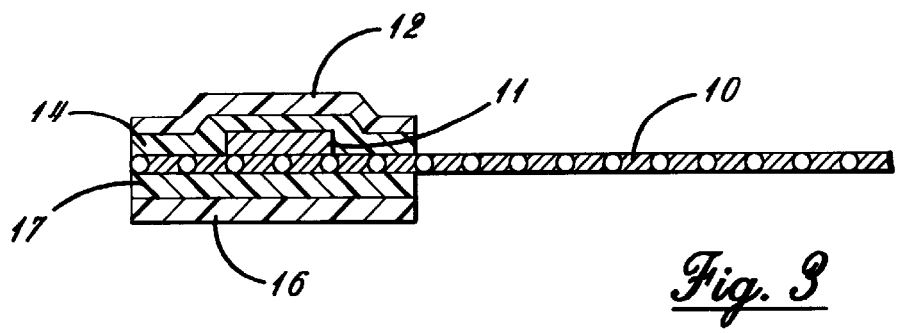
FIG. 3 is a vertical sectional view taken approximately on the line 3—3 of FIG. 1.

Referring now more particularly to the drawings and to FIGS. 1 to 3 thereof, the finished product produced by the method of the invention is illustrated, and which includes a base sheet or current collector 10 formed of an electroconductive fibrous net, which can be of carbon fibers, a terminal 11 of dissimilar material which can be a sheet of metal, such as metal foil, a length of tape 12 with an adhesive layer 14 on top of terminal 11, and a length of tape 16 with an adhesive layer 17 thereon facing the bottom 18 of current collector 10.

The width of tape 12 is greater than the width of the terminal 11. The width of tape 16 may be substantially the same as the width of tape 12. The combination after assembly is subjected to pressure, such as rolling it between pressure rollers or between two pressure plates (not shown).

The adhesive layers 14 and 17 flow into the fiber interstices of collector 10 and around the terminal 12 retaining them together.

Due to the high viscosity of the pressure activated adhesive, the adhesive only partially encapsulates the fibers of the collector net 10, does not flow between the fibers and the terminal 12, and does not electrically insulate or separate them, but fastens them together in good electrically conductive contact.

Figure 4:
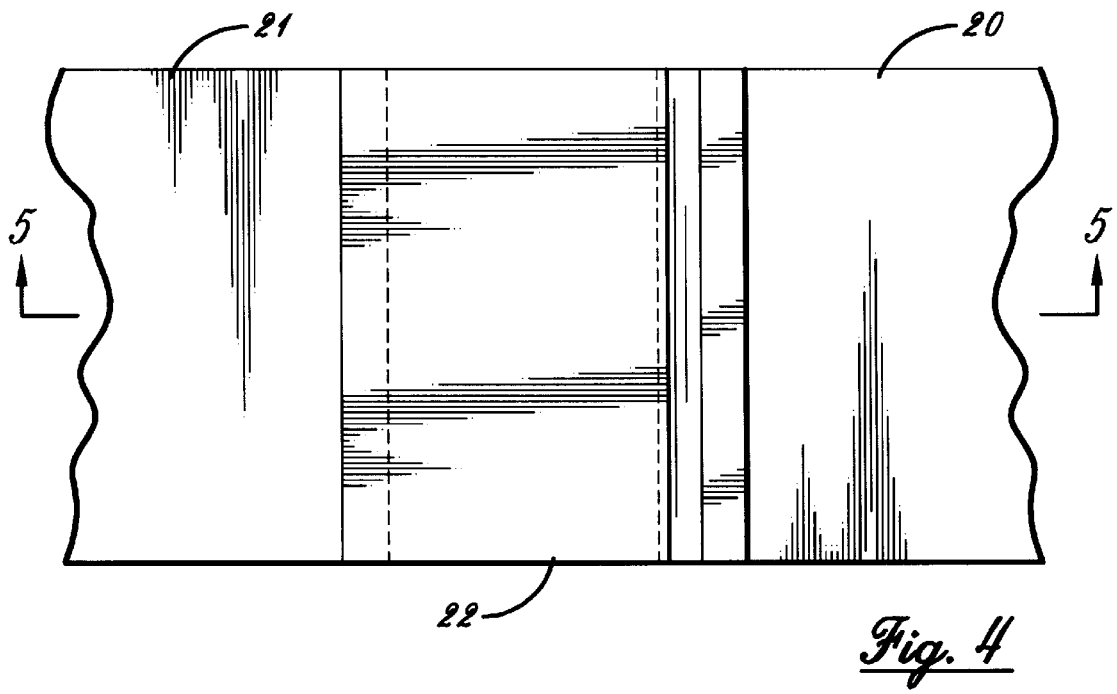
FIG. 4 illustrates the electroconductive joining of two fibrous net sheets or expanded metal foil sheets in an electrochemical device.
Figure 5:
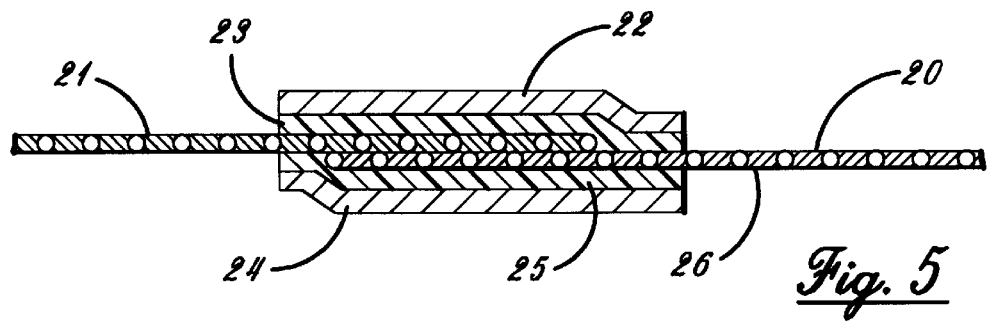
FIG. 5 is a vertical sectional view taken approximately on the line 5—5 of FIG. 4.

Referring now to FIGS. 4 and 5, the product as illustrated includes a base sheet of an electrically conductive fibrous net or current collector 20, a top sheet 21 of the same or similar material, a length of tape 22 with adhesive layer 23, and a length of tape 24 with an adhesive layer 25 facing the bottom 26 of sheet 20. The combination is assembled and pressure is applied a described above for FIG. 1. Adhesive layers 23 and 25 flow into the interstices in collectors 20 and 21 and adhere thereto and to each other. Due to the high viscosity of the pressure activated adhesive, the adhesive only partially encapsulates the interstices and fibers of the collectors 20 and 21, does not flow between the collectors 20 and 21, and does not electrically insulate them, but fastens them together in good electrically conductive contact.

Figure 6:
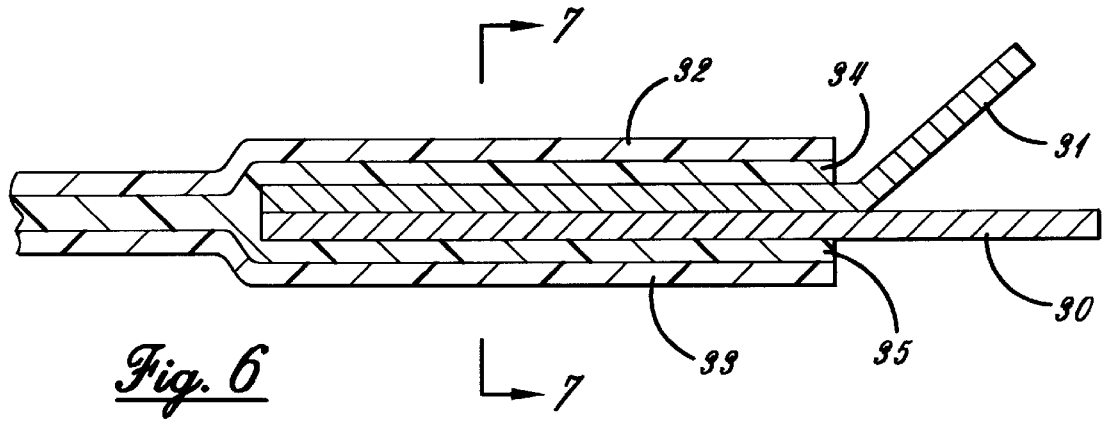
FIG. 6 illustrates the electroconductive joining of two solid metal sheets in an electrochemical device.
Figure 7:
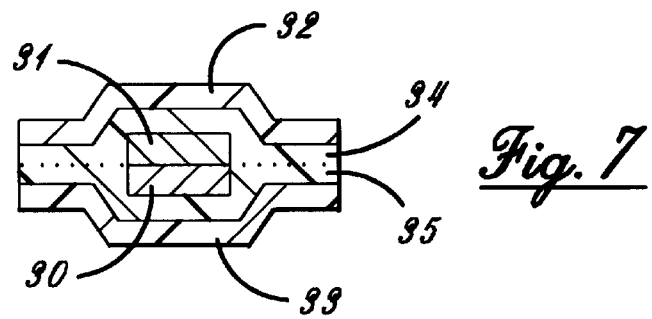
FIG. 7 is a vertical sectional view taken approximately on the line 7—7 of FIG. 6.

Referring now more particularly to FIGS. 6 and 7, an electrically conductive connection of two metal foil terminals 30 and 31 in an electrochemical device (not shown) is illustrated, which are between lengths of tape 32 and 33, which respectively have adhesive layers 34 and 35 thereon, which tapes are larger than terminals 30 and 31. The combination is assembled and pressure is applied which activates the adhesive and causes the assembly to be fastened together in good electrical contact. There is no adhesive or other material between the terminals 30 and 31 to interfere with the electroconductivity.

Figure 8:
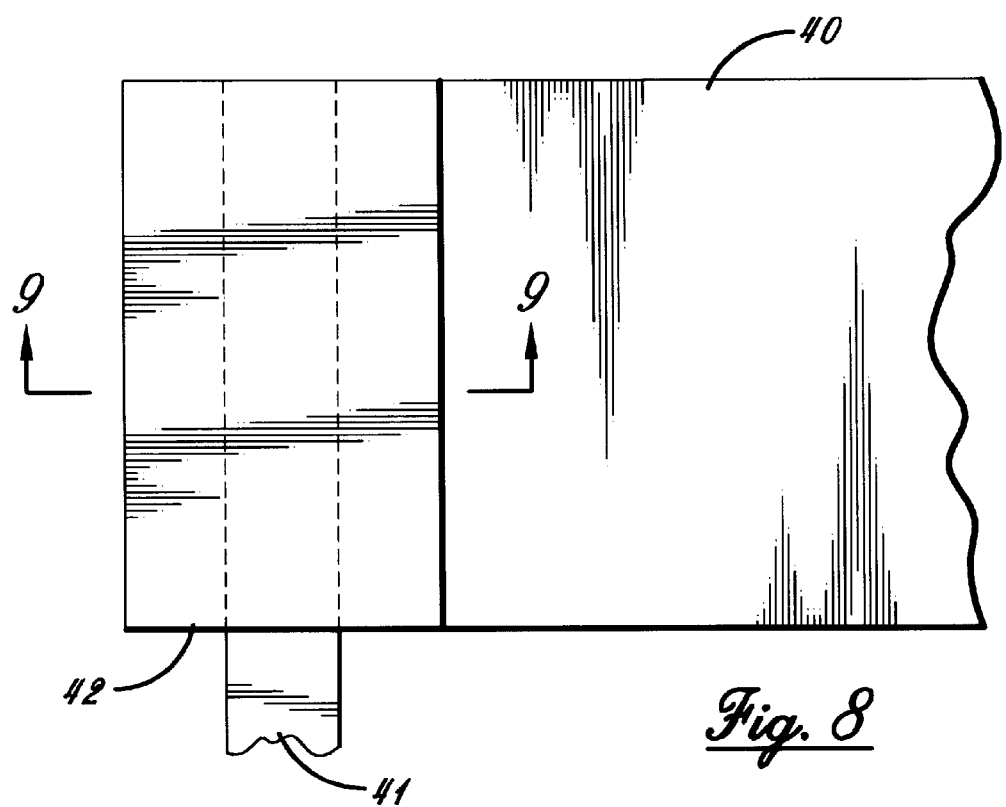
FIG. 8 illustrates the electroconductive joining of two solid metal sheets such as a current collector and a terminal in an electrochemical device.
Figure 9:
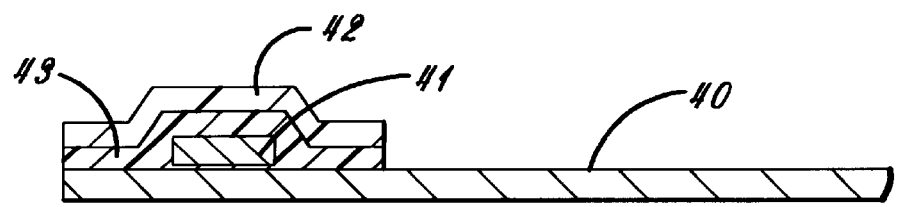
FIG. 9 is a vertical sectional view taken approximately on the line 9—9 of FIG. 8.

Referring now more particularly to FIGS. 8 and 9, the electrically conductive joining of a solid sheet collector 40 such as a sheet of metal foil to a solid sheet terminal 41, such as a sheet of metal foil is illustrated. A length of tape 42 is provided with a layer of pressure activated adhesive 43 thereon with the adhesive facing the terminal 41. The tape 42 is wider than the terminal 41. The combination is assembled and pressure is applied thereto, causing the adhesive to be activated and the terminal 41 to contact and electrically connect to sheet 40 with no solder or adhesive between the collector 40 and terminal 41.

While the materials to be joined have been described as of nickel and carbon fibers, various pairs of suitable electroconductive and corrosion-resisting materials, similar or dissimilar and compatible with the selected chemistry of a particular electrochemical device can be fastened or bonded together by this method.

It will thus be seen that a method has been described with which the objects of the invention are achieved.

We claim:

1. A method of electroconductively fastening electroconductive current collectors and metal terminals in alkali metal or alkaline earth metal batteries, and other electrochemical devices, where at least two sheets of electroconductive materials are to be electroconductively fastened together, which method comprises selecting a base sheet or current collector from the group consisting of electroconductive fibrous materials, selecting a second sheet of electroconductive solid sheet metallic material from the group consisting of metallic sheet materials, placing said second sheet on said base sheet, placing at least one tape with an adhesive layer on said sheets with said adhesive layer facing said sheets and contacting said base sheet and said second sheet, said at least one tape being wider than at least one of said sheets, applying pressure to said assembly and activating said adhesive to cause said adhesive to flow though said fibrous material and bond with said metallic sheet material, whereby said sheets are in electroconductive contact and retained together.

2. A method of electroconductively fastening electroconductive current collectors and metal terminals in alkali metal or alkaline earth metal batteries, and other electrochemical devices, where at least two sheets of electroconductive materials are to be electroconductively fastened together, which method comprises selecting a base sheet or current collector from the group consisting of electroconductive metallic solid sheet materials, selecting a second sheet of electroconductive solid sheet metallic material to be fastened to said base sheet, placing said second sheet on said base sheet, placing at least one tape with an adhesive layer on said sheets with said adhesive layer facing said sheets and contacting said base sheet and said second sheet, said at least one tape being wider than at least one of said sheets, applying pressure to said assembly and activating said adhesive to cause said adhesive to flow and bond with said metallic sheet material, whereby said sheets are in electroconductive contact and retained together.

3. A method of electroconductively fastening electroconductive current collectors and metal terminals in alkali metal or alkaline earth metal batteries, and other electrochemical devices, where at least two sheets of electroconductive materials are to be electroconductively fastened together, which method comprises selecting a base sheet or current collector from the group consisting of electroconductive fibrous materials, selecting a second sheet of electroconductive solid sheet metallic material to be fastened to said base sheet, placing said second sheet on said base sheet, placing at least one tape with an adhesive layer on said sheets with said adhesive layer facing said sheets and contacting said base sheet and said second sheet, said at least one tape being wider than at least one of said sheets, placing a second tape with a second layer of adhesive underneath said base sheet with said second layer facing said base sheet, said base sheet and said second sheet being substantially the same width and said second tape being substantially the same width as said first tape, and applying pressure to said assembly and activating said adhesive to cause said adhesive to flow and bond with said metallic sheet material, whereby said sheets are in electroconductive contact and retained together.

4. A method as defined in claims 1, 2 or 3 in which said adhesive is activated by pressure.

5. A method as defined in claims 1, 2 or 3 in which said adhesive is activated by heat.

6. A method as defined in claims 1, 2 or 3 in which said adhesive is activated by radiation.

7. A method as defined in claims 1 or 2 in which said at least one tape has a larger width than second sheet.

8. A method as defined in claims 1 or 3 in which said base sheet is of carbon fiber material.

9. A method as defined in claim 8, in which said carbon fiber material is a non-woven, open mesh fabric or net.

10. A method as defined in claims 1 or 2 or 3 in which said metallic material is nickel.

11. A method as defined in claims 1 or 2 or 3 in which said tape is of plastic polymer.

12. A method as defined in claim 11, in which said polymer is polypropylene.

13. A method as defined in claim 1 or 2 or 3, in which said tape is of metal.

14. A method as defined in claims 1 or 2 or 3 in which the adhesive of said at least one adhesive layer is acrylic based.

15. A method as defined in claims 1 or 2 or 3 in which said at least one adhesive and at least one tape are anhydrous.

16. A method as defined in claims 1 or 2 or 3 in which the adhesive of said at least one adhesive layer contains nickel powder.

17. A method as defined in claims 1 or 2 in which the adhesive of said base sheet is of nickel-coated carbon fiber material.

18. A method as defined in claims 2 or 3 in which said base sheet is of expanded metal foil.

19. A method as defined in claim 3 in which said base sheet is of woven material.

20. A method as defined in claim 3 in which said base sheet is of non-woven material.

21. A method as defined in claim 3 in which said adhesive is pressure activated.

22. A method as defined in claim 3 in which said adhesive is heat activated.

23. A method as defined in claim 3 in which said adhesive is radiation activated.

* * * * *